United States Patent [19]

Bergström et al.

[11] Patent Number: 4,577,826
[45] Date of Patent: Mar. 25, 1986

[54] STAND STRUCTURE FOR SUPPORTING ELECTRIC HIGH VOLTAGE EQUIPMENT

[75] Inventors: Tommy Bergström; Göran Boman; Leif Englund, all of Västerås, Sweden

[73] Assignee: ASEA Aktiebolag, Västerås, Sweden

[21] Appl. No.: 628,907

[22] Filed: Jul. 9, 1984

[30] Foreign Application Priority Data

Jul. 11, 1983 [SE] Sweden ............................ 8303928

[51] Int. Cl.⁴ .................... H02B 5/00; F16F 15/00
[52] U.S. Cl. .............................. 248/638; 361/333; 174/161 R; 52/167
[58] Field of Search ................. 174/161 R; 361/331, 361/332, 333, 429; 248/638, 676; 200/301; 52/167

[56] References Cited

U.S. PATENT DOCUMENTS

| | | | |
|---|---|---|---|
| 2,756,952 | 7/1956 | Gazley | 248/638 |
| 3,418,768 | 12/1968 | Cardan | 52/167 |
| 3,789,174 | 1/1974 | Barkan | 200/301 |
| 3,796,017 | 3/1974 | Meckler | 52/167 |
| 4,360,849 | 11/1982 | Harris | 361/333 |

FOREIGN PATENT DOCUMENTS 1415937 10/1968 Fed. Rep. of Germany ... 174/161 R

*Primary Examiner*—G. P. Tolin
*Attorney, Agent, or Firm*—Watson, Cole, Grindle & Watson

[57] ABSTRACT

A platform for carrying electric high-voltage equipment, such as series-capacitors etc., is supported by insulator columns which are articulated at the upper and lower ends. Bracing takes place with the aid of diagonally-braced insulators which are connected together by means of ropes via a prestressed spring damper. The means provides a high damping and a low natural frequency in case of earthquake stresses. Through the prestressing of the spring damper, the platform will remain stationary at low loads such as wind loads.

8 Claims, 10 Drawing Figures

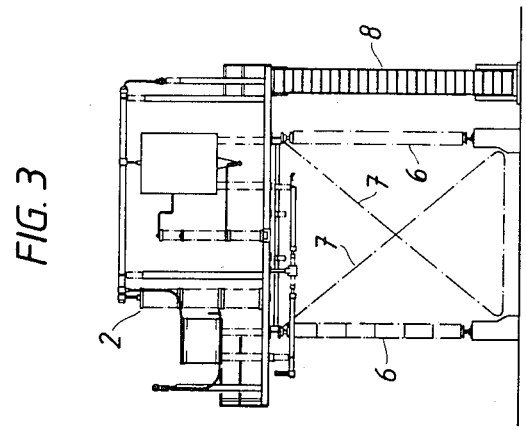
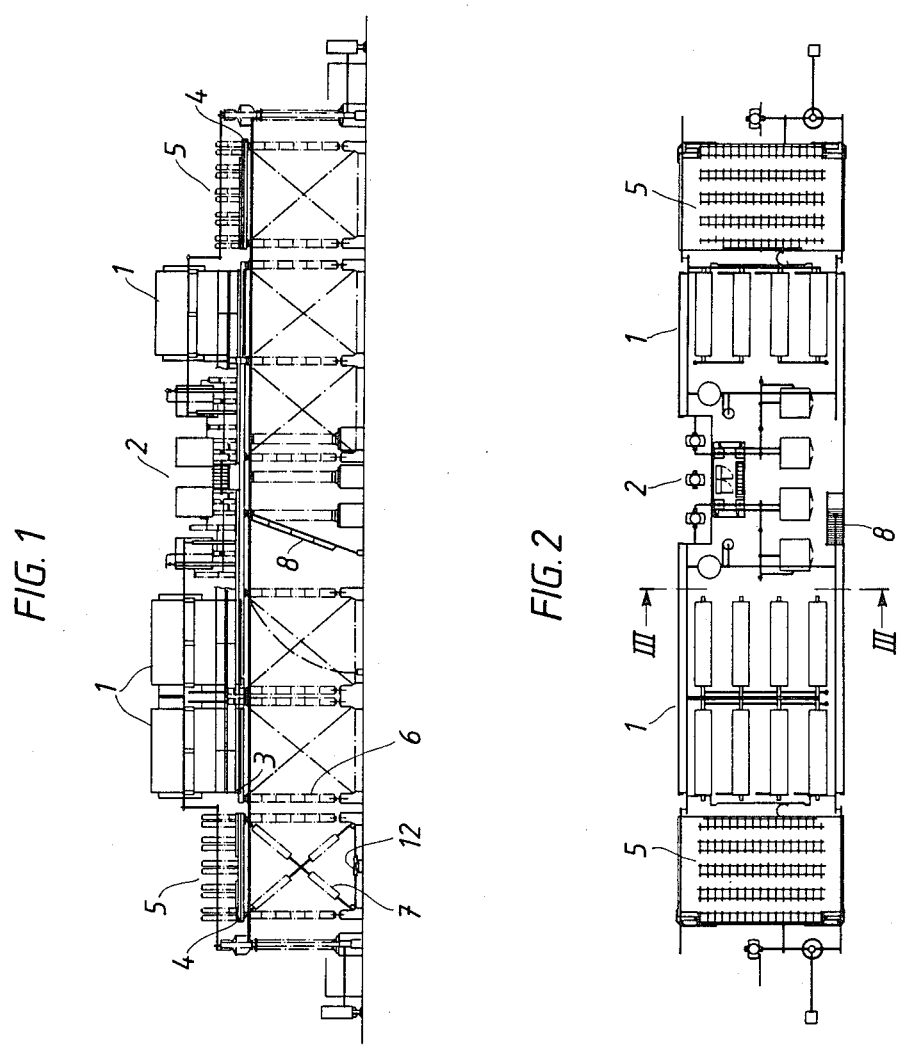

STAND STRUCTURE FOR SUPPORTING ELECTRIC HIGH VOLTAGE EQUIPMENT

BACKGROUND OF THE INVENTION

The present invention relates to a means for supporting electric high voltage equipment such as series-capacitors, cascade-connected test transformers, convertors for high-voltage direct current etc. The means comprises a platform and a plurality of insulator columns for supporting the platform.

Stand structures of the above-mentioned kind are often relatively high, and the stand and the equipment installed thereon can be subjected to considerable stresses caused by wind load and earthquake. Dimensioning the stand and the equipment to withstand these great forces according to the prior art technique involves considerable expenses.

SUMMARY OF THE INVENTION

The present invention aims to provide a platform structure which is considerably cheaper than corresponding, previously known designs and which, in addition, is more resistant to earthquakes and results in lower seismic stresses on the equipment mounted on the platform. This is achieved, according to the invention, by a construction in which the insulator columns are flexibly fixed at the top and bottom to the platform and to a foundation, respectively, and braced by means of insulators which are clamped diagonally between insulator columns arranged in pairs, said insulators being interconnected by means of ropes or link mechanisms via a spring damper.

Compared with a platform structure with spring-prestressed diagonal braces which are fixedly clamped in a conventional manner between the upper end of an insulator column and the lower end of the next insulator column, a great number of advantages (in addition to those mentioned above) are gained through the invention:

(a) The number of spring washers (cup springs) in the damping springs may be reduced to one-fourth, (b) The installation and erection of the stand is simplified since it is possible first to set the prestressing in the diagonal braces before the spring damper is fixed.

(c) The risk of breakdown (insulator fracture) during normal operating conditions is reduced, since the necessary prestress in the diagonal braces is considerably lower.

(d) The force which occurs in the vertical supporting insulators (the insulator columns) in case of an earthquake is reduced.

(e) The risk of the insulator chains (the diagonal braces) slackening and thereby knocking against each other is eliminated.

(f) The platform cannot be lifted from the supporting insulators.

(g) Since the spring damper is prestressed with a greater force than the diagonal braces, for example with 30 kN in the damper and 20 kN in the braces, the advantage is obtained that the platform will remain stationary at moderate wind loads. In this way, among other things, unnecessary wear in the joints arranged at the ends of the supporting insulators is eliminated.

BRIEF DESCRIPTION OF THE DRAWING

The invention will be described in greater detail with reference to an embodiment shown in the accompanying drawings, wherein FIG. 1 shows a side view of a series-capacitor equipment installed on platforms constructed according to the invention, FIG. 2 shows the same equipment in a plane view, FIG. 3 shows a section along the line III—III in FIG. 2.

DESCRIPTION OF THE PREFERRED EMBODIMENT

Figure 4:
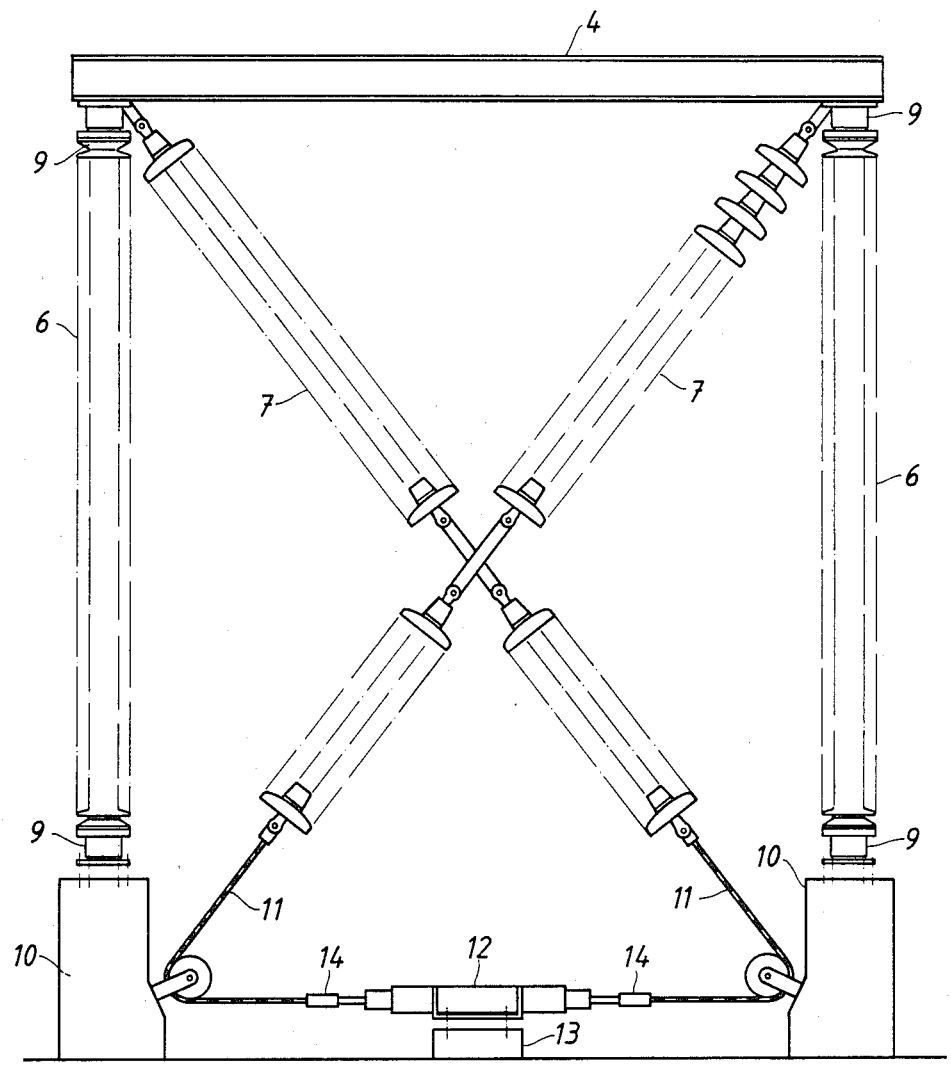
FIG. 4 shows the platform structure on an enlarged scale.

FIGS. 1–3 shows one phase of a series capacitor equipment connected into a three-phase high-voltage line. The equipment comprises series capacitor banks 1 with protective equipment 2 mounted on a central platform 3 as well as voltage-dependent protective resistors 5 mounted on two smaller platforms 4. The total length of the three platforms is about 50 m and they are situated at a height above the ground of about 6.5 m supported by supporting insulators 6 with diagonal braces 7. A ladder 8 may be arranged for inspection of the equipment when this is dead.

FIG. 4 shows how a platform 4 is supported by insulator columns 6, which by means of joints 9 are flexibly fixed at the top to the platform 4 and at the bottom to a foundation 10. The bracing takes place with the aid of insulator chains 7 braced diagonally between the insulator columns 6, said insulator chains 7 being interconnected by means of ropes 11 via a prestressed spring damper 12, which is fixed to a plinth 13. The ropes 11 are each prestressed by means of a prestressing member 14.

Figure 5:
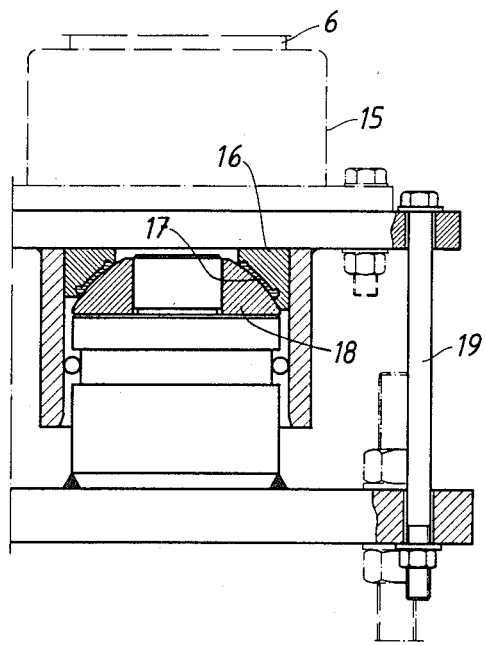
FIG. 5 shows an axial section through a joint for the supporting insulators of the platform.

FIG. 5 shows the embodiment of a joint 9 for the attachment of an insulator column 6 to the foundation 10. The lower end fittings 15 of the insulator column have a bearing member 16 with a cup-shaped sliding surface with inserts 17 of polytetrafluoroethylene. The bearing member 16 rests against a spherical surface of a corresponding bearing member 18 which is fixed to the foundation 10. The attachment at the upper end of the insulator column is carried out in a corresponding manner. This arrangement permits the insulator column to be inclined at an angle of about 8° from the vertical line in all directions. To simplify installation, the insulator columns may be fixed at their foundations in the vertical direction with the aid of bolts 19, which are removed after the diagonal braces have been mounted.

Figure 6:
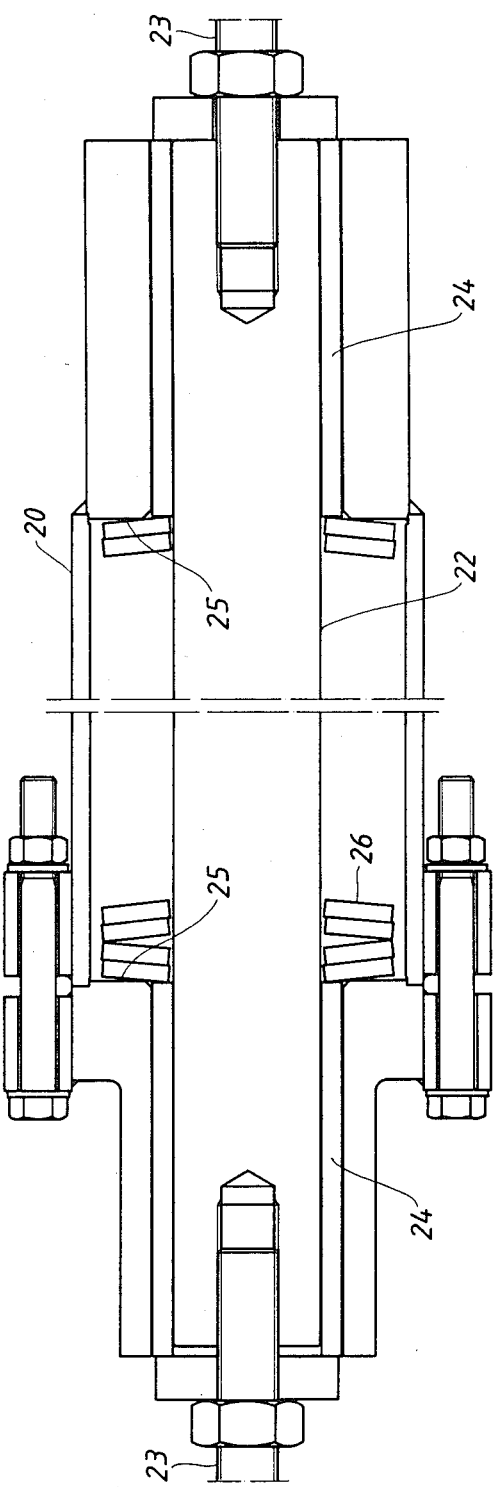
FIG. 6 shows an axial section through a spring damper included in the means according to the invention.
Figure 8:
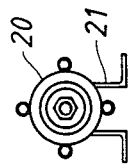
FIGS. 7 and 8 show the spring damper according to FIG. 6 in a side view and an end view, respectively.
Figure 7:
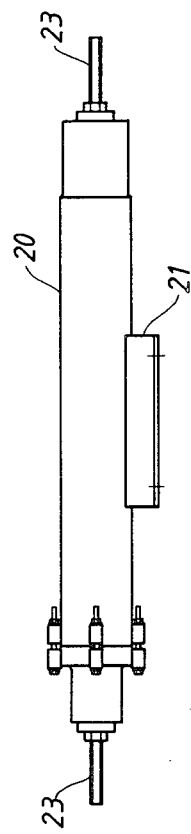

FIGS. 6–8 show the embodiment of the spring damper 12. It has an elongated cylindrical housing 20 with fixing members 21 for attaching the damper on the plinth 13. Axially through the housing there extends a rod 22, the ends of which are provided with threaded pins 23 for mounting the prestressing members 14 of the clamping ropes. The end portions of the rod 22 are surrounded by tubular cylindrical members 24, which rest against a spring assembly 26, clamped between shoulders 25 in the housing, consisting of a great number of cup springs. This spring assembly is prestressed with a force of, for example, 30 kN.

Figure 9:
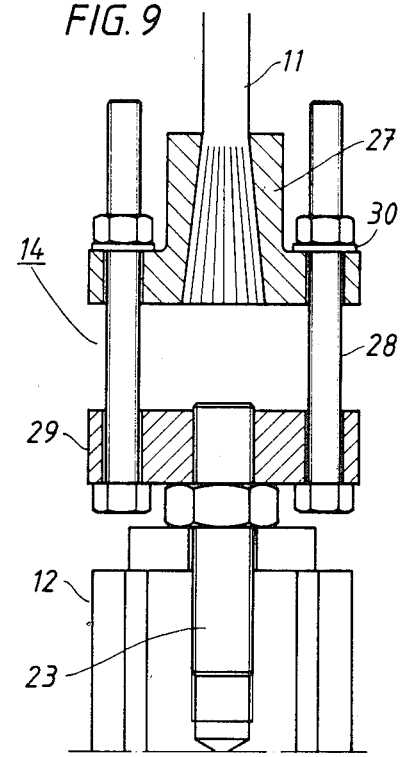
FIG. 9 shows a central section through a prestressing member for the diagonal braces of the platform.

FIG. 9 shows a possible embodiment of the prestressing member 14 of the ropes 11. A rope 11 in the form of a steel wire is here shown attached to a clamping plate 27, which by means of bolts 28 is clamped to a flange 29 fixed on the connection pin 23 of the spring damper 12. The desired prestressing in the ropes may be obtained by using calibrated spring tension plates 30 below the nuts of the bolts 28, said plates 30 indicating by being compressed that a certain prestressing force has been attained. Each rope may suitably be prestressed with a force of 20 kN.

Figure 10:
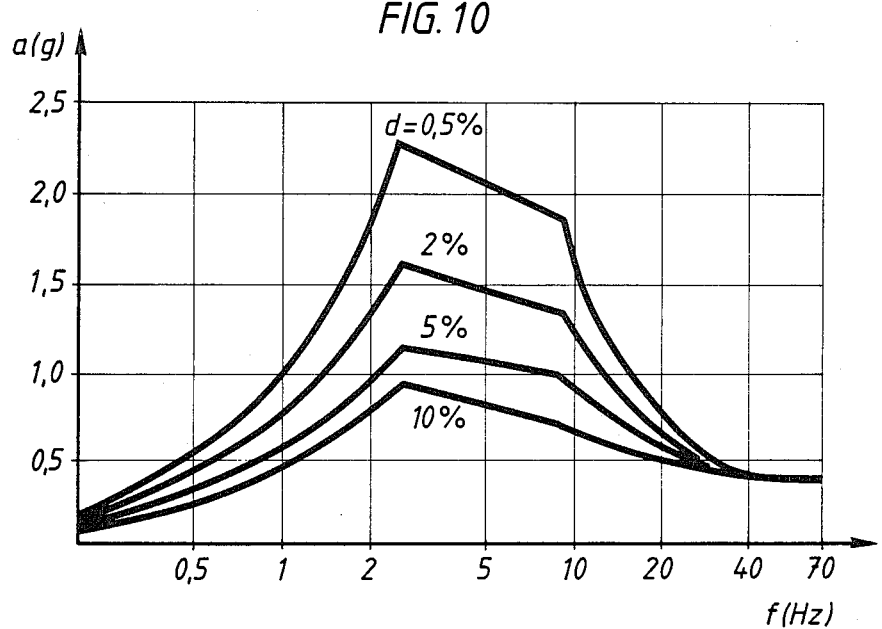
FIG. 10 shows a so-called earthquake response spectrum for explanation of the function of the damping device.

FIG. 10 shows by way of a diagram the acceleration response obtained in a so-called unidimensional oscillator when this is influenced by an earthquake movement. The diagram indicates the maximum acceleration a versus the natural frequency f and the damping d (as a percentage of critical damping) of the unidimensional oscillator. It will be clear from the curves that a maximum stress on the oscillator (corresponding to the platform structure in the present case) is obtained when the oscillator has a natural frequency of 2.5 Hz. With the aid of a spring damper according to the present invention, the natural frequency can be reduced, for example, to 1 Hz, which results in considerably lower stresses. In addition, the spring contributes to increase the damping, which also contributes to reduce the stress, as will be clear from the curves. With the natural frequency mentioned, the platform will oscillate during the earthquake with an amplitude of a maximum of 2 dm. By selecting a softer spring, the natural frequency can be further reduced, but this will also increase the displacement to unacceptable values. The spring damper should therefore be constructed so that the lowest natural frequency for the structure lies within the range 0.5–1.5 Hz. Calculations have shown that with a stand structure according to the invention, the earthquake stress on the equipment mounted on the platform will be less than half of what it would have been if a stand structure with conventional diagonal braces without a spring damper had been used.

The invention is not limited to the embodiment shown but several modifications are possible within the scope of the claims. For example, the spring damper 12 need not be arranged between the lower ends of the bracing insulators 7, but the damper may alternatively be arranged between the upper ends of the insulators, whereby the housing 20 of the damper is fixed to the respective platform 3, 4. Furthermore, the ropes 11 may be replaced by link mechanisms, and instead of the spring damper 12 there may be used a leaf spring or screw spring with a damper, fixed to the foundation.

What is claimed is:

1. A stand structure adapted to support electric high-voltage equipment, said structure comprising:
   a platform on which said equipment can be mounted,
   a plurality of substantially vertically extending insulator columns carrying said platform,
   universal joints at opposite ends of said insulator columns articulately connecting said columns at their top to the platform and at their bottom to column foundations,
   bracing means for said insulator columns, said bracing means including insulators which are stretched cross-diagonally between the ends of two adjacent of said insulator columns and interconnected by means of flexible connecting means, and
   a spring damper operatively connected to said flexible connecting means, said damper comprising a housing which is fixedly mounted in relation to said column foundations or in relation to said platform.

2. The stand structure according to claim 1, wherein said flexible connecting means are ropes.

3. The stand structure according to claim 1, wherein said flexible connecting means are link mechanisms.

4. A stand structure according to claim 1, wherein said spring damper is prestressed.

5. A stand structure according to claim 4, wherein said spring damper comprises an elongated housing provided with fixing members, said housing comprising a rod extending axially through the housing, said rod having at its ends connection members for clamping said flexible connecting means as well as cylindrical members supporting against a spring assembly clamped between two shoulders in the housing.

6. A stand structure according to claim 2, wherein said ropes are provided with prestressing members.

7. A stand structure according to claim 6, wherein said spring damper and the prestressing members of the ropes are arranged such that the prestressing of the spring damper is greater than the prestressing of the ropes.

8. A stand structure according to claim 1, wherein said spring damper is so arranged that the natural frequency of the structure is less than 2 Hz.

* * * * *